United States Patent [19]

Shibata et al.

[11] Patent Number: 4,866,199

[45] Date of Patent: Sep. 12, 1989

[54] OPTICALLY ACTIVE ESTER COMPOUND

[75] Inventors: Toshihiro Shibata; Masaki Kimura; Norio Kurosawa, all of Urawa, Japan

[73] Assignee: Adeka Argus Chemical Co., Ltd., Tokyo, Japan

[21] Appl. No.: 164,878

[22] Filed: Mar. 8, 1988

[30] Foreign Application Priority Data

| | | | |
|---|---|---|---|
| Mar. 20, 1987 | [JP] | Japan | 62-67447 |
| May 27, 1987 | [JP] | Japan | 62-130293 |
| Jul. 15, 1987 | [JP] | Japan | 62-176721 |
| Oct. 20, 1987 | [JP] | Japan | 62-264250 |

[51] Int. Cl.[4] ..................... C09K 19/20; C07C 69/78; C07C 69/84; C07C 69/92

[52] U.S. Cl. ..................... 560/65; 560/73; 560/109; 252/299.01; 252/299.67; 350/350.5

[58] Field of Search ..................... 350/350 R, 350.5; 252/299.67, 299.01; 560/65, 73, 109

[56] References Cited

U.S. PATENT DOCUMENTS

| | | | |
|---|---|---|---|
| 4,149,413 | 4/1979 | Gray et al. | 252/299.67 |
| 4,195,916 | 4/1980 | Coates et al. | 252/299.67 |
| 4,592,858 | 6/1986 | Higuchi et al. | 252/299.01 |
| 4,596,667 | 6/1986 | Inulcai et al. | 252/299.65 |
| 4,613,209 | 9/1986 | Goodly et al. | 350/350.5 |
| 4,622,165 | 11/1986 | Kano et al. | 252/299.67 |
| 4,643,842 | 2/1987 | Taguchi et al. | 252/299.67 |
| 4,710,585 | 12/1987 | Taguchi et al. | 252/299.67 |
| 4,725,688 | 2/1988 | Taguchi et al. | 252/299.01 |
| 4,728,458 | 5/1988 | Higuchi et al. | 252/299.01 |
| 4,732,699 | 3/1988 | Higuchi et al. | 252/299.01 |
| 4,786,730 | 11/1988 | Shibata et al. | 252/299.01 |
| 4,801,756 | 1/1989 | Kano et al. | 252/299.01 |
| 4,804,759 | 2/1989 | Shibata et al. | 252/299.01 |

FOREIGN PATENT DOCUMENTS

| | | | |
|---|---|---|---|
| 60-84388 | 5/1985 | Japan | 560/73 |
| 60-168780 | 9/1985 | Japan | 252/299.01 |
| 60-168781 | 9/1985 | Japan | 252/299.01 |
| 62-95381 | 5/1987 | Japan | 252/299.01 |

OTHER PUBLICATIONS

DeCobert et al, Mol. Cryst. Liq. Cryst., vol. 114, pp. 237-247 (1984).

Goodby et al, Liq. Cryst. & Ordered Fluids, vol. 4, pp. 1-32 (1984).

Goodby et al., J. Am Chem. Soc., vol. 108, pp. 4729-4735 (Aug. (1986).

Goodby et al., J. Am. Chem. Soc., vol. 108, pp. 4736-4742 (Aug. 1986).

*Primary Examiner*—Teddy S. Gron
*Assistant Examiner*—J. E. Thomas
*Attorney, Agent, or Firm*—Young & Thompson

[57] ABSTRACT

An optically active ester compound is provided represented by the following general formula:

$$R_1\text{-}(O)_m\text{-}C_6H_4\text{-}X\text{-}C_6H_4\text{-}(O)_n\text{-}(CH_2)_p\text{-}\overset{*}{C}H(CH_3)\text{-}CH_2\text{-}CH(Y)\text{-}R_2$$

wherein $R_1$ is a normal alkyl group having from 6 to 18 carbon atoms; m is zero or one, n is zero or one, and m+n is one or two; X is —CO—O— or —O—CO—; p is 3 to 6; Y is a hydrogen atom or chlorine atom; $R_2$ is hydrogen or a normal alkyl group having from 1 to 11 carbon atoms but may be a hydrogen atom only when Y is a chlorine atom; and *C represents an asymmetric carbon atom. The ester compound of the present invention is useful as a ferroelectric liquid crystal compound.

7 Claims, No Drawings

OPTICALLY ACTIVE ESTER COMPOUND

BACKGROUND OF THE INVENTION

1. Field of the Invention

This invention releates to an optically active alkyl or alkoxy benzoic acid alkyl or alkoxyphenyl ester compound which is useful as a ferroelectric liquid crystal compound.

2. Description of the Prior Art

Methods of displaying with a liquid crystal display element widely used today may be classified into those of twisted nematic (TN) and dynamic scattering (DS) types. These methods involve nematic liquid crystals cells comprising nematic liquid crystals as the main component. One of the disadvantages of conventional nematic liquid crystal cells is that their response speed is of the order of several milliseconds at the most, which considerably restrict the application thereof. It has been recently found that a higher response speed can be obtained by using a smectic liquid crystal cell.

It has been disclosed that some optically active smectic liquid crystals show ferroelectricity and thus the application thereof has been eagerly expected. An example of the ferroelectric liquid crystals is 2-methylbutyl 4-(4-n-decyloxybenzylidenamino)-cinnamate which will be abbreviated to DOBAMBC hereinafter. This compound is characterized by showing a ferroelectricity in the chiral smectic phase which will be abbreviated to Sc* phase hereinafter.

Since it was found that a DOBAMBC film cell had a high response speed of the order of a microsecond, this ferroelectric liquid crystal compound has attracted public attention as a material available not only in display devices of, for example, a liquid crystal TV but also in various optoelectronics devices such as a photoprinter head, an optical Fourier-transform element and a light valve.

However the DOBAMBC has not been utilized in practice yet, since it is chemically unstable because of the presence of a Schiff base structure therein.

SUMMARY OF THE INVENTION

It is the object of the present invention to provide an optically active compound useful as a ferroelectric liquid crystal compound.

The present invention provide a compound of following general formula.

$$R_1\text{-}(O)_m\text{-}\langle\bigcirc\rangle\text{-}X\text{-}\langle\bigcirc\rangle\text{-}(O)_n\text{-}(CH_2)_p\text{-}\overset{*}{C}H(CH_3)\text{-}CH_2\text{-}CH(Y)\text{-}R_2$$

wherein $R_1$ is a normal alkyl group having from 6 to 18 carbon atoms; m is zero or one, n is zero or one, and m+n is one or two; X is —CO—O— or —O—CO—; p is 3 to 6; Y is a hydrogen atom or chlorine atom; $R_2$ is hydrogen or a normal alkyl group having from 1 to 11 carbon atoms and may be a hydrogen atom only when Y is a chlorine atom; and *C represents an asymmetric carbon atom.

DETAILED DESCRIPTION OF THE INVENTION

The compound of the present invention as represented by the above general formujla can be prepared by conventional method.

For example, it may be prepared by reacting 4-n-alkylbenzoic acid or 4-n-alkoxybenzoic acid with 4-(optically-active alkyl)phenol or 4-(optically active alkoxy)phenol; or by reacting 4-(optically active alkyl)benzoic acid or 4-(optically active alkoxy)benzoic acid with 4-n-alkylphenol or 4-n-alkoxy phenol.

The obtained ester compound of the present invention as represented by the above general formula can be used alone as a liquid crystal material. Alternately it can be mixed with other liquid crystal compound(s).

To further illustrate the present invention, the following Examples will be given.

EXAMPLE 1

Synthesis of 4-(5′-methyldecyl)benzoic acid 4-n-octoxyphenyl ester 4.0 g of optically active 4-(5′-methyldecyl)benzoic acid prepared by reacting 4-methylnonylbromide with 4-methyl benzoic acid, 3.2 g of 4-n-octoxyphenol, 3.0 g of N,N′-di-cyclohexyl carbodiimide, 0.4 g of 4-pyrolidinopyridine and 100 ml of dichloromethane were stirred for 5 hours at room temperature.

The precipitated N,N′-dicyclohexyl urea were filtered and the filtrate was evaporated.

The product was purified on a silica gel column with the use of hexane/ether (95/5) as a developing solvent. Thus 4-(5′-methyldecyl)benzoic acid 4-n-octoxyphenyl ester was obtained.

Infrared spectroscopy ($cm^{-1}$): 3070(w), 2990(w), 2960(s), 2890(s), 1745(s), 1615(m), 1510(s), 1470(m), 1275(s), 1255(s), 1200(s), 1185(s), and 1080(s).

Optical rotation: $[\alpha]_D=-0.36°$ (C=1, $CHCl_3$ solution, 28° C.).

This compound was poured into a transparent glass electrode cell of 2 μm in thickness, which had been subjected to orientation by rubbing, and heated to 90° C. to thereby give an isotropic liquid.

The following phase transition was observed under a polarization microscope.

$$\text{Iso} \xrightarrow[28]{} \text{Ch} \xrightarrow[25]{} \text{Sc*} \xrightarrow[5]{} \text{Cry} \quad (°\text{C.})$$

Iso-isotropic, Ch: cholesteric,
Sc*: chiral smectic, Cry: crystal.

EXAMPLE 2

Synthesis of 4-(7′-methylundecyl)benzoic acid 4-n-hexyloxyphenyl ester

The procedure of Example 1 was followed except that the 4-(5′-methyldecyl)benzoic acid and 4-n-octoxyphenol were replaced by 4-(7′-methylundecyl)benzoic acid prepared by reacting 6-methyldecylbromide with 4-methylbenzic acid and 4-n-hexyloxyphenol to thereby give the title compound.

Infrared spectroscopy ($cm^{-1}$): 3070(w), 2990(w), 2950(s), 2880(s), 1740(s), 1615(m), 1505(s), 1470(m), 1275(s), 1255(s), 1200(s), 1185(s), and 1080(s).

Optical rotation: $[\alpha]_D=+0.17°$ (C=1, $CHCl_3$ solution, 29° C.).

This compound was poured into a transparent glass electrode cell of 2 μm in thickness, which had been subjected to orientation by rubbing, and heated to 90° C. to thereby give an isotropic liquid.

The following phase transition was observed under a polarization microscope.

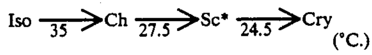

EXAMPLE 3

Synthesis of 4-n-amylbenzoic acid 4-(4'-methyloctoxy)phenyl ester

The procedure of Example 1 was followed except that the 4-(5'-methyldecyl)benzoic acid and 4-n-octoxyphenol were replaced by 4-n-amylbenzoic acid and 4-(4'-methyloctoxy)-phenol prepared by reacting 4-methyloctylbromide with hydroquinone to thereby give the title compound.

Infrared spectroscopy ($cm^{-1}$): 3050(w), 2960(s), 2940(s), 2870(m), 1740(s), 1615(m), 1505(s), 1470(m), 1420(w), 1380(w), 1270(s), 1250(s), 1200(s), 1180(m), 1105(vw), 1070(s), 1020(m), 920(vw), 870(w), 820(w), 755(w), 700(w), 630(vw), 580(vw) and 520(w).

Optical rotation: $[\alpha]_D = +1.50°$ (C=2, $CHCl_3$ solution, 26° C.).

This compound was poured into a transparent glass electrode cell of 2 μm in thickness, which had been subjected to orientation by rubbing, and heated to 90° C. to thereby given an isotropic liquid.

The following phase transition was observed under a polarization microscope.

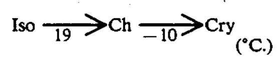

EXAMPLE 4

Synthesis of 4-n-butylbenzoic acid 4-(4'-methyldecyloxy)phenyl ester

The procedure of Example 1 was followed except that the 4-(5'-methyldecyl)benzoic acid and 4-n-octoxyphenol were replaced by 4-n-butylbenzoic acid and 4-(6'-methyldecyloxy)-phenol prepared by reacting 6-methyldecylbromide with hydroquinone to thereby give the title compound.

Infrared spectroscopy ($cm^{-1}$): 3050(vw), 2960(s), 2940(s), 2870(m), 1740(s), 1615(m), 1505(s), 1470(m), 1420(w), 1380(w), 1270(s), 1250(s), 1200(s), 1180(m), 1105(vw), 1070(s), 1020(m), 925(vw), 870(w), 850(w), 820(vw), 755(w), 700(w), 630(vw), 580(vw) and 520(w).

Optical rotation: $[\alpha]_D = +1.16°$ (C=2, $CHCl_3$ solution, 26° C.).

This compound was poured into a transparent glass electrode cell of 2 μm in thickness, which had been subjected to orientation by rubbing, and heated to 90° C. to thereby give an isotropic liquid.

The following phase transition was observed under a polarization microscope.

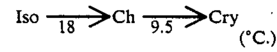

EXAMPLE 5

Synthesis of (R)-4-(6'-chloro-4'-methylhexyloxy)benzoic acid 4-n-octylphenyl ester 1.3 g of (R)-4-(6'-chloro-4'-methylhexyloxy)benzoic acid ($[\alpha]_D = +5.00°$, C=1, $CHCl_3$ solution, 25° C.), 1.0 g of 4-n-octylphenol, 1.1 g of N,N'-dicyclohexyl carbodiimide, 0.1 g of 4-pyrolidinopyridine and 15 ml of dichloromethane were stirred for 3 hours at room temperature.

30 ml of n-hexane was added therein, and stirred for 10 minutes. The precipitated N,N'-dicyclohexyl urea were filtered and the filtrate was evaporated.

The product was purified on a silica gel column with the use of hexane/ether (9/1) as a developing solvent and then recrystallized from ethanol. Thus (R)-4-(6'-chloro-4'-methylhexyloxy)benzoic acid 4-n-octylphenyl ester was obtained.

Infrared spectroscopy ($cm^{-1}$): 3050(vw), 2900(s), 2850(m), 1720(vs), 1610(s), 1510(s), 1460(m), 1250(vs), 1200(s), 1160(vs), 1080(s) and 720(m)

Optical rotation: $[\alpha]_D = +3.21°$ (C=1, $CHCl_3$ solution, 25° C.).

This compound was poured into a transparent glass electrode cell of 2 μm in thickness, which had been subjected to orientation by rubbing, and heated to 90° C. to thereby give an isotropic liquid.

The following phase transition was observed under a polarization microscope.

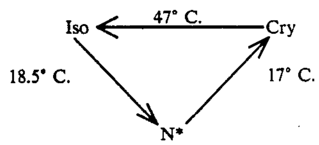

EXAMPLE 6

Synthesis of (R)-4-(6'-chloro-4'-methyloctoxy)benzoic acid 4-n-octylphenyl ester 1.5 g of (R)-4-(6'-chloro-4'-methyloctoxy)benzoic acid ($[\alpha]_D = +8.07°$, C=1, $CHCl_3$ solution, 25° C.), 1.0 g of 4-n-octylphenol, 1.1 g of N,N'-dicyclohexyl carbodiimide, 0.1 g of 4-pyrolidinopyridine and 20 ml of dichloromethane were stirred for 3 hours at room temperature.

The precipitaed N,N'-dicyclohexyl urea were filtered and the filtrate was evaporated.

The product was purified on a silica gel column with the use of hexane/ether (93/7) as a developing solvent. Thus (R)-4-(6Z'-chloro-4'-methyloctoxy)benzoic acid 4-n-octylphenyl ester was obtained.

Infrared spectroscopy ($cm^{-1}$): 3050(vw), 2900(s), 2875(m), 1735(s), 1610(s), 1585(w), 1515(s), 1465(m), 1260(vs), 1205(s), 1175(vs), 1075(s) and 1020(m)

Optical rotation: $[\alpha]_D = +5.41°$ (C=1, $CHCl_3$ solution, 25° C.)

This compound was poured into a transparent glass electrode cell of 2 μm in thickness, which had been subjected to orientation by rubbing, and heated to 90° C. to thereby give an isotropic liquid.

The following phase transition was observed under a polarization microscope.

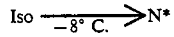

EXAMPLE 7

Synthesis of (R)-4-(6'-chloro-4'-methylnonyloxy)benzoic acid 4-n-hexyloxyphenyl ester 1.6 g of (R)-4-(6'-chloro-4'-methylnonyloxy)benzoic acid ($[\alpha]_D = +3.37°$, C=1, $CHCl_3$ solution, 23° C.), 1.0 g of 4-n-hexyloxyphenol, 1.1 g of N,N'-dicyclohexyl carbodiimide, 0.1 g of 4-pyrolidinopyridine and 20 ml of dichloromethane were stirred for 3 hours at room temperature.

The precipitated N,N'-dicyclohexyl urea were filtered and the filtrate was evaporated.

The product was purified on a silica gel column with the use of hexane/ether (93/7) as a developing solvent. Thus (R)-4-(6'-chloro-4'-methylnonyloxy)benzoic acid 4-n-hexyloxyphenyl ester was obtained.

Infrared spectroscopy ($cm^{-1}$): 3050(vw), 29508s), 2850(m), 1720(s), 1600(s), 1500(s), 1460(m), 1250(s), 1200(s), 1160(s) and 1070(s).

Optical rotation: $[\alpha]_D = +2.56°$ (C=1, $CHCl_3$ solution, 23° C.).

This compound was poured into a transparent glass electrode cell of 2 μm in thickness, which had been subjected to orientation by rubbing, and heated to 50° C./ to thereby give an isotropic liquid.

The liquid crystal cell thus obtained was cooled under a crossed Nicol prism while applying rectangular pulses (15 V. 1 Hz) thereto. As a result, definite switching behaviors were observed below 12.5° C.

The following phase transition was observed under a polarization microscope.

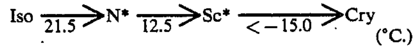

EXAMPLE 8

Synthesis of (S)-4-(4'-methylheptyloxy)benzoic acid 4-n-octylphenyl ester 1.2 g of (S)-4-( 4'-methylheptyloxy)benzoic acid, 1.0 g of 4-n-octylphenol, 1.1 g of N,N'-dicylohexyl carbodiimide, 0.1 g of 4-pyrolidinopyridine and 15 ml of dichloromethane were stirred for 3 hours at room temperature.

30 ml of n-hexane was added therein, and stirred for 10 minutes. The precipitated N,N'-dicyclohexyl urea were filtered and the filtrate was evaporated.

The product was purified on a silica gel column with the use of hexane/ether (96/4) as a developing solvent and then recrystallized from methanol. Thus (S)-4-(4'-methylheptyloxy)benzoic acid 4-n-octylphenyl ester was obtained.

Infrared spectroscopy ($cm^{-1}$): 3020(vw), 2900(s), 2840(m), 1720(s), 1600(s), 1500(s), 1460(m), 1250(vs), 1200(s), 1160(vs) and 1070(m).

Optical rotation: $[\alpha]_D = +1.49°$ (C=1, $CHCl_3$ solution, 25° C.).

This compound was poured into a transparent glass electrode cell of 2 μm in thickness, which had been subjected to orientation by rubbing, and heated to 50° C. to thereby give an isotropic liquid.

The following phase transition was observed under a polarization microscope.

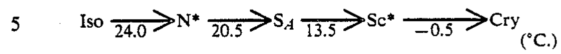

EXAMPLE 9

Synthesis of (S)-4-(4'-methylheptyloxy)benzoic acid 4-n-hexyloxyphenyl ester

The procedure of Example 8 was followed except that the 4-n-octylphenol was replaced by 4-n-hexyloxyphenol to thereby give the title compound.

Infrared spectroscopy ($cm^{-1}$): 3050(vw), 2900(s), 2850(m), 1720(s), 1600(s), 1500(s), 1470(m), 1250(vs), 1200(s), 1170(s) and 1080(s).

Optical rotation: $[\alpha]_D = +1.50°$ (C=1, $CHCl_3$ solution, 25° C.).

This compound was poured into a transparent glass electrode cell of 2 μm in thickness, which had been subjected to orientation by rubbing, and heated to 50° C. to thereby give an isotropic liquid.

The following phase transition was observed under a polarization microscope.

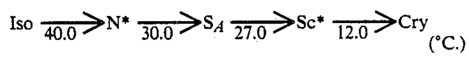

EXAMPLE 10

Synthesis of (S)-4-(5'-methyloctoxy)benzoic acid 4-n-octylphenyl ester

The procedure of Example 8 was followed except that the (S)-4-(4'-methylheptyloxy)benzoic acid was replaced by (S)-4-(5'-methyloctoxy)benzoic acid to thereby give the title compound.

Infrared spectroscopy ($cm^{-1}$): 3030(vw), 2950(s), 2850(m), 1730(s), 1600(s), 1510(s), 1460(m), 1250(vs), 1200(s), 1170(s) and 1070(m).

Optical rotation: $[\alpha]_D = +0.59°$ (C=1, $CHCl_3$ solution, 25° C.).

This compound was poured into a transparent glass electrode cell of 2 μm in thickness, which had been subjected to orientation by rubbing, and heated to 50° C. to thereby give an isotropic liquid.

The following phase transition was observed under a polarization microscope.

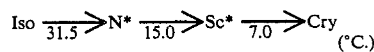

EXAMPLE 11

Synthesis of (S)-4-(6'-methylnonyloxy)benzoic acid 4-n-octylphenyl ester

The procedure of Example 8 was followed except that the (S)-4-(4'-methylheptyloxy)benzoic acid was replaced by (S)-4-(6'-methylnonyloxy)benzoic acid to thereby give the title compound.

Infrared spectroscopy ($cm^{-1}$): 300(vw), 2900(s), 2850(m), 1730(s), 1600(m), 1500(m), 1460(m), 1250(s), 1200(m), 1160(s) and 1070(m).

Optical rotation:

$[\alpha]_D = +0.91°$ (C=1, $CHCl_3$ solution, 25° C.).

This compound was poured into a transparent glass electrode cell of 2 μm in thickness, which had been subjected to orientation by rubbing, and heated to 70° C. to thereby give an isotropic liquid.

The liquid crystal cell thus obtained was cooled under a crossed Nicol prism while applying rectangular pulses (15 V. 1 Hz) thereto. As a result, definite switching behaviors were observed within a temperature range of 36.5° C. to −5° C. The following phase transition was observed under a polarization microscope.

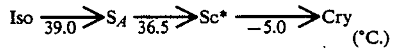

EXAMPLE 12

Synthesis of (R)-4-n-hexyloxybenzoic acid 4-(6'-chloro-4'-methylhexyloxy)phenyl ester 0.98 g of 4-n-hexyloxybenzoic acid, 0.97 g of (R)-4-(6'-chloro-4'-methylhexyloxy)phenol ($[\alpha]_D=+2.02°$, C=1, $CHCl_3$ solution, 24° C.), 0.91 g of N,N'-dicyclohexyl carbodiimide, 0.09 g of 4-pyrolidinopyridine and 20 ml of dichloromethane were stirred for 5 hours at room temperature.

The precipitated N,N'-dicyclohexyl urea were filtered and the filtrate was evaporated.

The product was purified on a silica gel column with the use of hexane/ether (85/15) as a developing solvent and then recrystallized from methanol. Thus (R)-4-n-hexyloxybenzoic acid 4-(6'-chloro-4'-methylhexyloxy)-phenyl ester was obtained.

Infrared spectroscopy ($cm^{-1}$): 3070(vw), 2940(s), 2875(m), 1730(s), 1610(s), 1515(s), 1470(m), 1390(w), 1315(w), 1255(vs), 1200(s), 1170(s), 1105(w) and 1075(s).

Optical rotation: $[\alpha]_D=+1.70°$ (C=1, $CHCl_3$ solution, 26° C.).

This compound was poured into a transparent glass electrode cell of 2 μm in thickness, which had been subjected to orientation by rubbing, and heated to 90° C. to thereby give an isotropic liquid.

The following phase transition was observed under a polarization microscope.

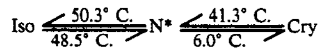

EXAMPLE 13

Synthesis of (R)-4-n-octylbenzoic acid 4-(6'-chloro-4'-methyloctoxy)phenyl ester The procedure of Example 12 was followed except that the 4-n-hexyloxybenzoic acid and (R)-4-(6'-chloro-4'-methylhexyloxy)phenol were replaced by 4-n-octylbenzoic acid and (R)-4-(6'-chloro-4'-methyloctoxy)-phenol ($[\alpha]_D=+5.82°$, C=1, $CHCl_3$ solution, 26° C.).

The crude product was purified on a silica gel column with the use of hexane/ether (9/1) as a developing solvent. Thus (R)-4-n-octylbenzoic acid 4-(6'-chloro-4'-methyloctoxy)phenyl ester was obtained.

Infrared spectroscopy ($cm^{-1}$): 305(vw), 2940(s), 2870(m), 1735(s), 1615(m), 1505(s), 1465(m), 1420(w), 1380(w), 1270(s), 1245(s), 1200(s), 1180(m), 1105(w), 1075(s), 1020(m), 930(vw), 905(vw), 875(w), 825(w), 760(w), 700(w), 665(vw), 635(vw), 605(vw), 580(vw) and 520(w).

Optical rotation: $[\alpha]_D=+4.15°$ (C=1, $CHCl_3$ solution, 27° C.).

This compound was poured into a transparent glass electrode cell of 2 μm in thickness, which had been subjected to orientation by rubbing, and heated to thereby give an isotropic liquid.

The following phase transition was observed under a polarization microscope.

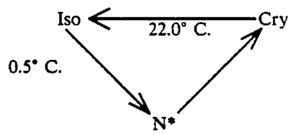

EXAMPLE 14

Synthesis of (R)-4-n-octoxybenzoic acid 4-(6'-chloro-4'-methyldecyloxy)phenyl ester The procedure of Example 12 was followed except that the 4-n-hexyloxybenzoic acid and (R)-4-(6'-chloro-4'-methylhexyloxy)phenol were replaced by 4-n-octoxybenzoic acid and (R)-4-(6'-chloro-4'-methyldecyloxy)-phenol ($[\alpha]_D=+2.00°$, C=1, $CHCl_3$ solution, 26° C.) to thereby give the title compound.

Infrared spectroscopy ($cm^{-1}$): 3070(vw), 2940(vs), 2875(s), 1730(vs), 1610(m), 1510(m), 1465(m), 1380(w), 1315(vw), 1300(w), 1270(s), 1250(s), 1200(s), 1170(m), 1105(w) and 1075(s).

Optical rotation: $[\alpha]_D=-0.74°$ (C=1, $CHCl_3$ solution, 27° C.).

This compound was poured into a transparent glass electrode cell of 2 μm in thickness, which had been subjected to orientation by rubbing, and heated to thereby give an isotropic liquid.

The following phase transition was observed under a polarization microscope.

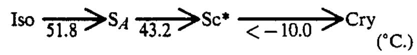

EXAMPLE 15

Synthesis of (S)-4-n-octoxybenzoic acid 4-(4'-methylheptyloxy)phenyl ester 0.75 g of 4-n-octoxybenzoic acid, 0.67 g of (S)-4-(4'-methylheptyloxy)phenol, 0.62 g of N,N'-dicyclohexyl carbodiimide, 0.06 g of 4-pyrolidinopyridine and 20 ml of dichloromethane were stirred for 5 hours at room temperature.

The precipitated N,N'-dicyclohexyl urea were filtered and the filtrate was evaporated.

The product was purified on a silica gel column with the use of hexane/ether (95/5) as a developing solvent. Thus (S)-4-n-octoxybenzoic acid 4-(4'-methylheptyloxy)phenyl ester was obtained:

Infrared spectroscopy ($cm^{-1}$): 2925(s), 2875(s), 1725(s), 160(s), 1580(vw), 1510(s), 1465(m), 1420(vw), 1395(vw), 1380(vw), 1270(s), 1260(s), 1200(s), 1170(s), 1105(vw), 1075(s), 1030(m), 875(w), 850(w), 825(w), 805(vw), 765(m), 695(w), 655(vw), 580(vw) and 520(w).

Optical rotation: $[\alpha]_D=+2.80°$ (C=1, $CHCl_3$ solution, 25° C.).

This compound was poured into a transparent glass electrode cell of 2 μm in thickness, which had been subjected to orientation by rubbing, and heated to thereby give an isotropic liquid.

The following phase transition was observed under a polarization microscope.

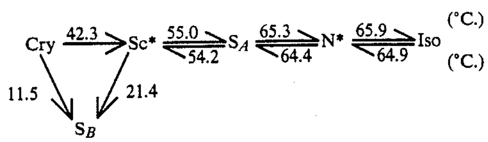

EXAMPLE 16

Synthesis of (S)-4-n-octoxybenzoic acid 4-(5'-methyloctoxy)phenyl ester

The procedure of Example 15 was followed except that the (S)-4-(4'-methylheptyloxy)phenol was replaced by (S)-4-(5'-methyloctoxy)phenol to thereby give the title compound.

Infrared spectroscopy ($cm^{-1}$): 2925(s), 2875(s), 1725(s), 1610(s), 1580(vw), 1510(s), 1460(m), 1425(vw), 1395(vw), 1380(vw), 1280(s), 1250(s), 1200(s), 1170(s), 1105(vw), 1075(s), 1015(vw), 965(vw), 875(vw), 845(w), 810(vw), 765(m), 690(w), 655(vw), 570(vw) and 520(w).

Optical rotation: $[\alpha]_D = +1.69°$ (C=1, $CHCl_3$ solution, 26° C.).

This compound was poured into a transparent glass electrode cell of 2 μm in thickness, which had been subjected to orientation by rubbing, and heated to thereby give an isotropic liquid.

The following phase transition was observed under a polarization microscope.

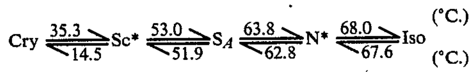

EXAMPLE 17

Synthesis of (S)-4-n-nonyloxybenzoic acid 4-(6'-methyldecyloxy)phenyl ester

The procedure of Example 15 was followed except that the 4-n-octoxybenzoic acid and (S)-4-(4'-methylheptyloxy)phenol were replaced by 4-n-nonyloxybenzoic acid and (S)-4-(6'-methyldecyloxy)phenol.

The crude product was purified by recrystallization using ethanol/acetone (9/1) as solvent. Thus (S)-4-n-nonyloxybenzoic acid 4-(6'-methyldecyloxy)phenyl ester was obtained.

Infrared spectroscopy ($cm^{-1}$): 2925(s), 2875(s), 1725(s), 1610(s), 1580(vw), 1510(s), 1465(m), 1420(vw), 1395(vw), 1380(vw), 1275(s), 1260(s), 1200(s), 1175(s), 1105(vw), 1080(s), 1040(m), 1015(m), 875(w), 855(w), 825(w), 805(vw), 765(m), 725(vw), 695(w), 655(vw), 580(vw) and 520(w).

Optical rotation:

$[\alpha]_D = +1.23°$ (C=1, $CHCl_3$ solution, 26° C.).

This compound was poured into a transparent glass electrode cell of 2 μm in thickness, which had been subjected to orientation by rubbing, and heated to thereby given an isotropic liquid.

The following phase transition was observed under a polarization microscope.

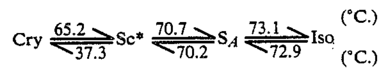

What is claimed is:

1. An optically active ester compound represented by the following general formula:

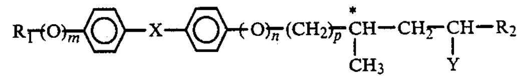

wherein $R_1$ is a normal alkyl group having from 6 to 18 carbon atoms; m is zero or one, n is zero or one, and m+n is one or two; X is —CO—O— or —O—CO—; p is 3 to 6; Y is a hydrogen atom or chlorine atom; $R_2$ is hydrogen or a normal alkyl group having from 1 to 11 carbon atoms and may be a hydrogen atom only when Y is a chlorine atom; and *C represents an asymmetric carbon atom.

2. An ester compound according to claim 1 of the formula, wherein X is —CO—O—.

3. An ester compound according to claim 1 of the formula, wherein X is —O—CO—.

4. An ester compound according to claim 1 of the formula, wherein Y is hydrogen atom.

5. An ester compound according to claim 1 of the formula, wherein Y is chlorine atom.

6. An ester compound according to claim 1 of the formula, wherein n is zero.

7. An ester compound according to claim 1 of the formula, wherein n is one.

* * * * *